March 8, 1960   E. M. PALMER ET AL   2,928,070
AMPLITUDE RECORD CONVERSION APPARATUS
Filed April 28, 1958   5 Sheets-Sheet 1

INVENTORS
ELTON M. PALMER
WARREN E. WICKERHAM
RALPH D. WYCKOFF
BY
ATTORNEY

March 8, 1960     E. M. PALMER ET AL     2,928,070

AMPLITUDE RECORD CONVERSION APPARATUS

Filed April 28, 1958     5 Sheets-Sheet 2

INVENTORS
ELTON M. PALMER
WARREN E. WICKERHAM
RALPH D. WYCKOFF
BY
ATTORNEY

United States Patent Office 2,928,070
Patented Mar. 8, 1960

2,928,070

AMPLITUDE RECORD CONVERSION APPARATUS

Elton M. Palmer, Oakmont, Warren E. Wickerham, Penn Township, Allegheny County, and Ralph D. Wyckoff, Oakmont, Pa., assignors to Gulf Research & Development Company, Pittsburgh, Pa., a corporation of Delaware Application April 28, 1958, Serial No. 731,364

10 Claims. (Cl. 340—15)

This invention pertains to apparatus for converting variable-amplitude records to variable-density records. More particularly the invention pertains to apparatus for converting a variable-amplitude or so-called "spot-trace" seismogram to a seismogram in which the same or corresponding signals appear in variable-density form. The invention has particular utility when applied to seismograms employed in the seismic type of geophysical exploration.

In the past it has been customary to record geophysical seismograms in the form of galvanometric spot traces on a photographic recording medium such as sensitized paper. These seismic records are made in the field immediately subsequent to firing the seismic shot, and photographic development of the record is generally done soon thereafter. Such records have been successfully interpreted and computed, and they have led to the finding of many valuable oil and gas fields. However, due to the limitations of visual observation of such spot-trace seismograms many of the records have defied analysis. Even on the good records, all of the recorded seismic events could not be analyzed and utilized.

In recent years it has become customary in geophysical prospecting to record seismograms in the field in phonographically reproducible form, whereupon it becomes possible to make various types of analyses during subsequent playback. Examples of phonographically reproducible media employed for original recording are the magnetic form, employing magnetic tape, and the variable-area and the variable-density forms, both employing photographic film. From records of such types, the original seismic signals are readily recoverable and may be re-recorded after appropriate treatment, as, for example, by filtering, mixing, clipping, altering of time scale, etc. The results of such treatment have been eminently successful and have materially enhanced the value of seismic exploration. Moreover, the use of phonographically reproducible seismograms has permitted making the processing apparatus largely automatic and this in turn has speeded up the analysis of such conveniently reproducible seismograms.

It has, however, heretofore been impossible to apply these automatic analyses to the spot-trace type of records. The various companies engaged in seismic exploration have accumulated in their files many thousands of such spot-trace records on photographic paper, a considerable fraction of which have never been completely analyzed. In many cases, spot-trace records have been accumulated over a period of twenty-five years or more, and resurveying of the districts represented by these records, utilizing modern reproducible techniques, might be prohibitively expensive, and leasing and permits for reworking these areas may even be unobtainable. It is the purpose of this invention to provide means whereby spot-trace seismograms may be converted to variable-density records so that they can be analyzed with available reproducing and computing apparatus. More particularly this invention concerns means for converting a spot-trace record to a photographic record on a transparent film base, comprising a series of parallel variable-density tracks, each of which contains the seismic-signal content of the corresponding trace of the spot-trace record. Adjusted contact prints of the variable-density records may then be made in a device known as a seismic profile printer, an example of which is described in copending Palmer application, Serial No. 561,085, now Patent 2,861,507 which is assigned to the same assignee as the present application. In its more particular aspects therefore, the invention of the present application provides a way of obtaining from spot-trace seismograms the necessary variable-density seismograms from which a variable-density seismic profile can easily be made.

The older spot-trace records were commonly made in oscillographic recorders for which the speed of paper travel was adjusted to differing standards, or not accurately controlled. For example, a nominal paper travel speed of 12 inches/second might actually be 11.75 inches per second in one instance and 12.25 inches per second in another. Likewise, the travel speed might vary through a portion of this range on different sections of a single record. Moreover, it is well known that photographic paper may change its dimensions in the wet photographic processes (developing, fixing, etc.) to which it is subjected subsequent to the actual recording. Furthermore, the paper changes its dimensions in response to changes in atmospheric humidity subsequent to recording. In order to make accurate seismic analyses from the variable-density records produced by the apparatus of this invention, it is necessary to adjust for differences in the time scale of the spot-trace records, and reduce the data to a common or standard value. The apparatus of this invention includes simple means for making this adjustment in the course of the conversion from a spot-trace record to a corresponding variable-density record.

The invention is described in this specification with reference to the drawings forming a part hereof and in which like numerals refer to like parts, and in which.

Figure 1:
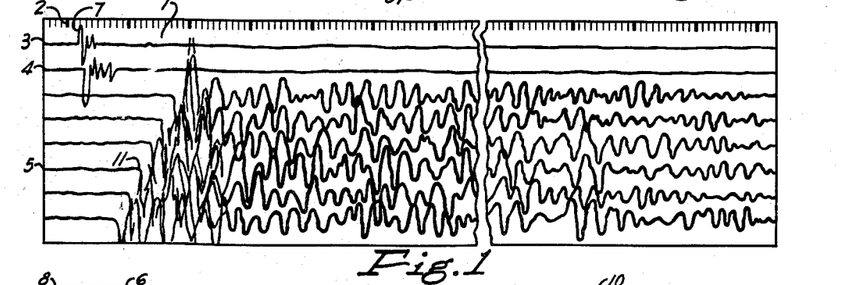
Figure 1 illustrates a multi-trace seismogram of the type to which the invention is applicable.

In Figure 1 there is illustrated at 1 a typical geophysical multi-trace seismogram as usually made on a strip of photographic paper. During the recording process timing lines 2 are exposed on the record in well-known manner, usually at one-hundredth-second intervals. The timing lines 2 are shown only at one edge of the record in Figure 1 but they may be on both edges or extend all the way across. Usually tenth-second marks are made heavier, as indicated. The seismogram 1 has the spot-traces of a number of oscillographs, these having been recorded photographically in well-known manner. For simplicity of illustration Figure 1 shows only eight oscillograph traces, but it is customary in the art to employ many more. The trace indicated by 3 is the shot-moment, or time-break trace, and deflection of this trace at 7 shows the instant of detonation of the shot. The trace indicated by 4 may be the trace of an up-hole geophone, i.e. a geophone placed on the surface of the ground at the shot point. The varying amplitudes of the other traces constitute the seismic signals recorded from geophones placed at various distances from the shot point, as is customary in seismic prospecting, the geophone positions lying usually along a straight line. The trace at the bottom of the record shows seismic signals received at the geophone nearest the shot point, and the other traces show seismic signals at other more distant geophone locations. The time-break and up-hole deflections are shown on separate traces in Figure 1, but either of these may be combined with a geophone trace in known manner if desired. It is to be understood that Figure 1 is for purposes of illustration only and does not per se form part of this invention.

No simple means has hitherto been available to phonographically reproduce the traces of Figure 1. A series of such seismograms is usually interpreted by visual inspection, and it is evidently impractical to analyze each and every seismic event shown. Therefore the geophysicist usually bases his interpretation on only the most prominent seismic signals, or reflections, and marks these for later computation. Other signals which may be of equal or greater geophysical significance are inevitably ignored, and information contained in such other less prominent signals is thereby lost. One of the objects of this invention is to provide a method and apparatus for converting the seismograph traces of Figure 1 into a phonographically reproducible film record of the variable-density type so that the relationships between all signals may readily be recognized.

Figure 2:
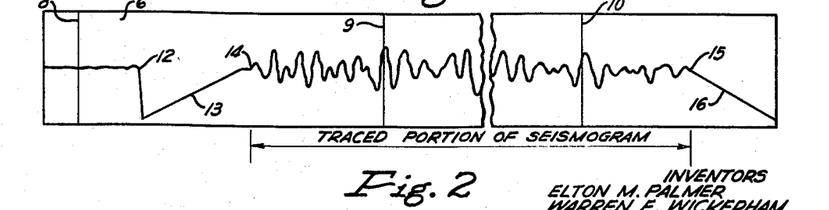
Figure 2 illustrates a tracing of seismic events copied from one trace of the seismogram of Figure 1.

The first step in the process of this invention is to copy the respective geophone traces onto a strip of matte-surface plastic film 6 of Figure 2. A transparent plastic strip about 0.006" to 0.008" thick, having a fine-grained matte surface on one side, is employed. A readily available plastic material, such as cellulose acetate or similar substance which is relatively stable in dimensions, having minimum dimension change with age, atmospheric humidity, and temperature, is preferred. In this invention it is not essential for the light transmission characteristic of this film to be uniform, and variation of this characteristic in no way detracts from the efficacy of this invention. For the operation of the device, a width of 35 mm. for film 6 has been found convenient.

By way of illustration, the copying of trace 5 of seismogram 1 onto the film 6 of Figure 2 will be described. The strip of film 6 is superposed matte side up on the seismogram 1, parallel to and bracketing the trace 5 to be copied. The film 6 is held in position with respect to the seismogram 1 as by means of pressure-sensitive adhesive tape or a simple clamping device (not shown) so that the film 6 may subsequently be easily removed from the seismogram. A fine line 8 transverse to the length of the film 6 is drawn across the film, as by means of a sharp pencil, in alignment with the leading edge of the deflection of the time break 7. Similar lines are drawn at positions as shown at 9 and 10 in Figure 2 at one-second intervals to the right of the time break 7 (Figure 1). These positions are determined by scaling from the timing lines 2 on the seismogram 1.

The trace 5 is then copied onto the film 6, preferably with a sharp pencil, the irregular shape of trace 5 being carefully followed. Should errors occur, the copied line may easily be erased with an ordinary eraser and the correct line drawn in. At the first arrival 11 (Figure 1) the trace 5 makes a rapid excursion downward and this is traced at 12 (Figure 2). Immediately subsequent to the first arrival 11, the trace may become lost on the seismogram owing to excessive amplitude, so that it cannot be followed for a short time interval. On the film 6 this condition is taken care of by constructing a line 13 sloping gently upward toward the axis of the trace and meeting the latter at some point slightly to the left of where the trace 5 can again be followed. A short section of zero line is then added on the film 6 until at 14 the trace 5 is again clearly identifiable. Trace 5 is then copied on film 6, usually from left to right, over the usable part of the seismogram. When a point 15 on film 6 is reached where the trace 5 is of no further interest, the line may be sloped downward toward the bottom of the film as shown at 16. The sloping lines 13 and 16, when required, prevent a transient signal from being subsequently introduced on the variable-density track, which would occur if the copied line were terminated abruptly. The hand-copied portion of the seismogram between points 14 and 15 will contain all seismic signals shown on the usable portion of the trace 5. The film 6 may now be removed from the seismogram 1.

A portion of the matte side of film 6 below the line thus drawn is then made opaque (not shown) as by painting with an opaque pigment. The upper boundary of the painted stripe must conform accurately to the irregular shape of the pencil trace, and the lower boundary of the painted stripe extends downward, or away from the pencil line a sufficient distance to accommodate the optical, electrical, and mechanical requirements of the apparatus, which will be described presently. The portion of the lower boundary of the painted stripe is not otherwise critical, and in width the stripe may extend below the upper boundary any distance greater than a minimum of about one-eighth inch. The film strip 6 thus becomes a copy suitable for use in the apparatus, and comprises the usable portion of the geophone trace 5 of the seismogram 1, with simplifications in those regions of the trace which are indeterminable because the excursions of the oscillograph spot are excessively large, or are of no interest.

By this hand-copying process the seismic traces of the seismogram 1 are each copied onto a strip of film similar to 6. For the record shown in Figure 1, there would result six strips similar to Figure 2, each being prepared from one of the seismic traces of the original seismogram 1. It has been found that after a little experience the above-described hand-copying process can be carried out quite rapidly.

In Figures 3 to 10 of the drawings there is shown an apparatus into which the films 6 are subsequently placed in succession to produce the desired variable-density record. In the apparatus shown schematically in Figure 9, the successive variable-density tracks are exposed in desired order on a strip of photographic film 102 placed on drum 32. The resultant record on the photographic film strip is subsequently available for playback at will, or may be used for further reproduction and correction as in the seismic profile printer previously mentioned, or in other seismogram-analyzing devices.

Figure 3:
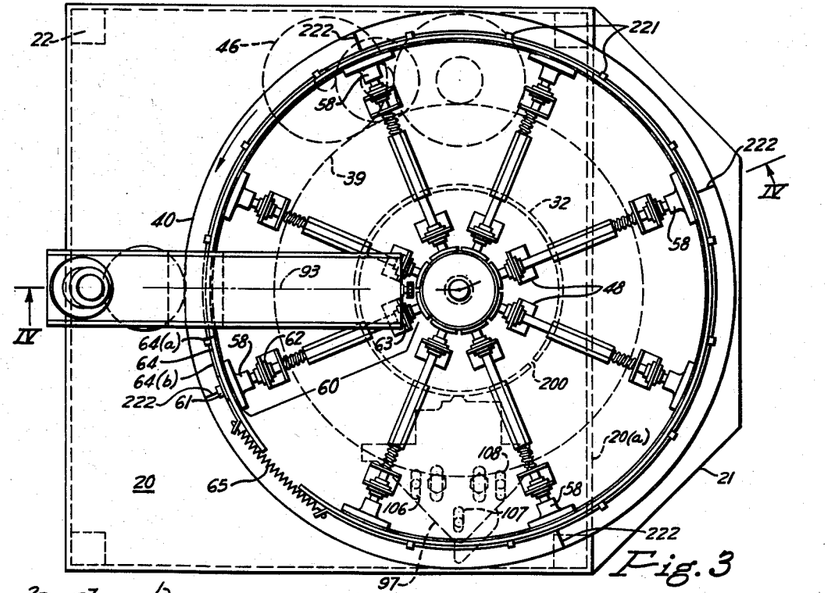
Figure 3 is a plan view of the apparatus for converting the copied trace of Figure 2 to variable-density form.
Figures 4, 5:
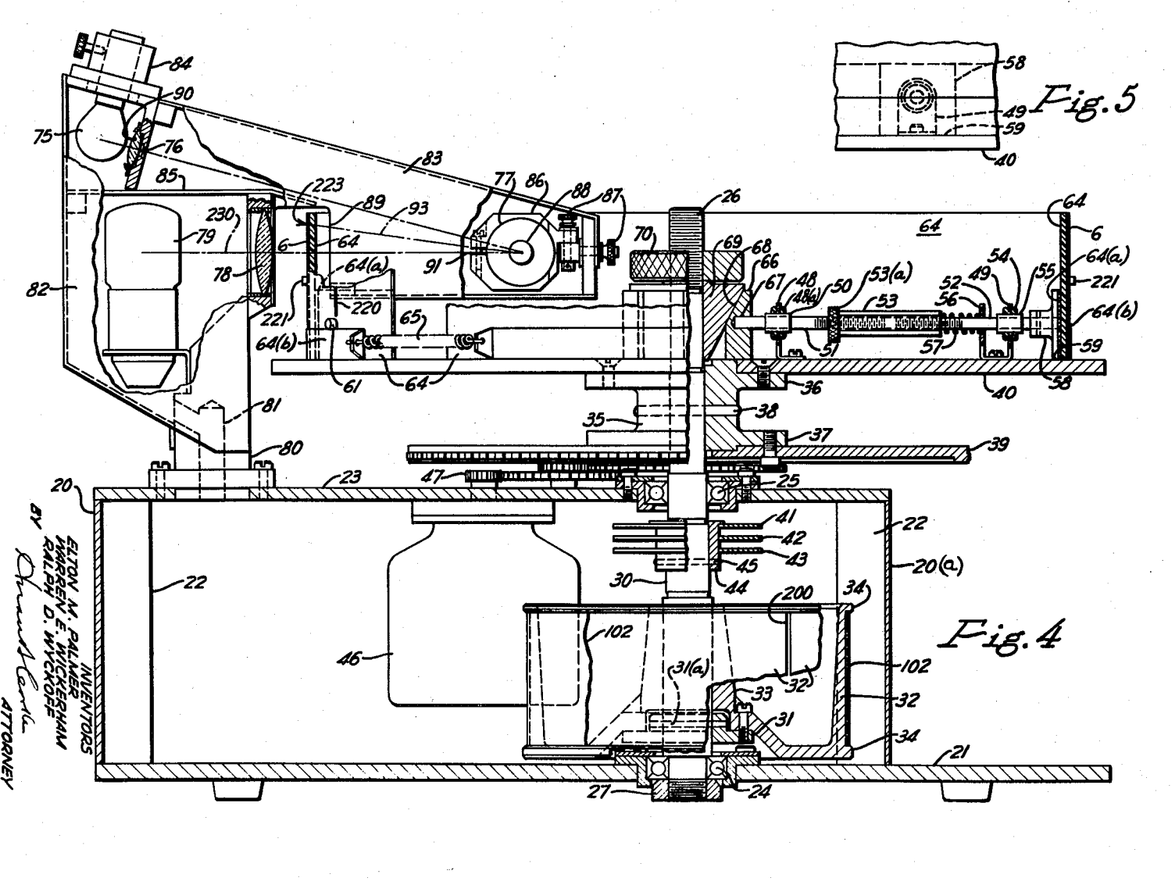
Figure 4 is a side view, partly in elevation and partly in cross-section, of the apparatus of Figure 3 taken along the line IV—IV.
Figure 5 is an end view of part of Figure 4 showing the structure of one of the radial arms employed in the invention.

Referring more specifically to Figures 3 and 4, a case 20 comprises a light-tight box having base plate 21 which rests on three or more rubber feet, and having a removable front cover 20(a). As best seen in Figure 4, the base plate 21 and the top plate 23 respectively carry ball bearings 24 and 25 which are mounted in aligned bearing housings fastened to the plates in conventional manner. Appropriate posts 22 at the corners of the box are provided to maintain proper spacing and alignment between the top and bottom plates 21 and 23. A main shaft 30 rotates in bearings 24 and 25, the shaft being threaded at its upper end 26. The shaft 30 fits snugly in the bearing 25. At the lower end of the shaft, a shoulder rests on the bearing 24, and below the bearing the shaft is threaded for a bearing-retaining nut 27. Bearing 24 is designed to bear in thrust the weight of the shaft and parts fastened thereto.

Inside the case 20 and just above the base plate 21, the shaft 30 carries a flanged bushing 31 fastened to the shaft by pin 31(a), as shown in Figure 4. The drum 32 with a hub 33 fits snugly on the shaft 30 and is screwed to the flanged bushing by three or more screws as shown. The drum 32 may be made of aluminum or other light material. The photographic film 102 (as shown in Figure 4), on which the variable-density record is to be made, is wound on the drum 32 between its top and bottom flanges 34. A slot 200 along one element of the cylindrical surface of the drum 32 extends between the flanges 34. The inside of the drum carries a clamp (more fully explained later in connection with Figure 6) whose purpose is to clamp the ends of the film 102, thereby holding the film in place in conventional manner. The slot 200 is related to the beginning and the end of a variable-density track to be exposed around the drum 32. Therefore the angular position of the slot 200 on shaft 30 will be a reference point in subsequent explanation of the apparatus.

Mounted on the shaft 30 some distance above the top plate 23 is a hub 35 having top and bottom flanges 36 and 37. The hub 35 is a hand-press fit on shaft 30 and is held to the shaft by a pin 38 in conventional manner. The lower flange 37 carries a large gear 39 held to the hub by means of screws, and the large gear 39 meshes with a gear train, as shown in Figure 4. The top flange 36 carries a large, flat circular plate, or turntable 40 which is held to the hub by means of screws as shown. In this manner the turntable 40, gear 39, and the drum 32 are all maintained in a fixed angular relationship as they rotate with the shaft 30 in bearings 24 and 25.

Three cams 41, 42, and 43 are fastened to a common hub 44 just beneath bearing 25. The hub 44 is pinned to the shaft 30 by means of pin 45. The cams 41, 42, and 43 actuate snap-action switches identified respectively as 41(a), 42(a), and 43(a). The switches are not shown in Figure 4 but appear in the wiring diagram Figure 10. Each of the switches 41(a), 42(a), and 43(a) is mounted on a bracket (not shown) fastened to the underside of the top plate 23. The function of these switches is to automatically perform certain operations which will be described later in connection with the explanation of Figure 10. The cams 41, 42, and 43 rotate with shaft 30 and are maintained in a fixed angular relationship to each other and to the turntable 40. The switches 41(a), 42(a), and 43(a) are oriented with respect to their associated cams 41, 42, and 43 so that each switch is actuated at the appropriate point in the rotation cycle to perform the desired operation.

The shaft of a synchronous motor 46, mounted under the top plate 23, protrudes through the plate 23. The motor shaft carries a pinion 47 located above the plate 23. The pinion 47 meshes with a gear train, comprising several speed-reducing gears as indicated in Figures 3 and 4, which drives the large gear 39, thereby rotating the shaft 30 and all the parts fastened thereto. The motor 46 is driven from a constant-frequency source, for example, a tuning-fork controlled A.-C. supply, or 60-c.p.s. A.-C. house current, which has been found sufficiently steady for the purpose.

The prepared film 6 of Figure 2 is mounted circumferentially edgewise on the turntable 40 in a manner to be described. Inasmuch as the opaque stripe on the film 6 has been derived from the paper seismogram 1 of Figure 1, the linear distance of any one second of time on film 6 depends upon the amount of dimensional change experienced by the paper seismogram 1 as well as upon the original recording speed of the paper seismogram and any variations in this speed. This invention inter alia provides for correcting such variations in timing by means to be described.

The turntable 40 carries a number of adjustable radial arms as may best be seen in Figure 3. Eight radial arms are illustrated but any number sufficient to provide the necessary radial adjustment and support may be employed. The effective length of these arms is adjustable radially and inasmuch as the basic construction of all arms is similar, it will suffice to describe but one of them. With reference to Figure 4, the turntable 40 carries, for each arm, an inner bracket 48 and outer bracket 49. The brackets 48 and 49 are on common center lines which coincide with effectively equally-spaced radii of turntable 40 (Figure 3). The inner bracket 48 is fastened to the turntable 40 by means of screws as shown. The upstanding part of the bracket 48 is bored to fit a rubber grommet 48(a) into which is pressed a metal sleeve 50. A rod 51 slides freely in the metal sleeve 50. The arm assembly is made of two rods 51 and 52, having right-hand and left-hand threads, respectively, which screw into a turnbuckle nut 53. Thus, by adjustment of the turnbuckle nut 53, the operator may adjust the effective radial length of the arm assembly. A lock nut 53(a) maintains the adjustment. The outer bracket 49 is U-shaped and is fastened to the turntable 40 by means of screws, as shown in Figure 4. The outer upstanding part of the bracket 49 is bored for a rubber grommet 54 into which is pressed a metal sleeve 55. The inner upstanding part 56 of the bracket 49 is bored slightly larger than the diameter of rod 52, and a helical spring 57 in compression is placed between the elements 56 and the nut 53. By this means the arm assembly can slide along a radius of the turntable 40, and is urged inward by the spring 57. A block 66, whose shape and function will be described later, is fixed to the inner end of each radial rod 51. A foot 58 is pinned to the outer end of rod 52, and the outer face of the foot 58 is generally square in shape, as may best be seen in Figure 5. The foot 58 has a flat edge 59, riding against the turntable 40, which keeps the foot and rod 52 from rotating during adjustment. The foot 58 has a generally cylindrical outer face, whose radius corresponds to that of the minimum extent of radial adjustment.

The moving part of the arm assembly 60 in Figure 3 is similar to the representative arm shown in Figure 4 except that the rod 52 projects through the outer foot (corresponding to 58 of Figure 4) and thereby the end of rod 52 becomes an indexing stud, as indicated by 61 in Figure 3. The feet 58 of all the other arm assemblies are smooth on their cylindrical outer face. In the mounting for the arm assembly 60, the rubber grommets (shown as 48(a) and 54 in Figure 4) are replaced by metallic bushings 62 and 63. This is done in order to insure that the indexing stud 61 remains in a fixed angular position on the turntable 40.

It will be convenient, prior to the ensuing discussion, to assume that by means of the adjustment provided by the turnbuckle nuts 53, each of the feet 58 (including that of arm 60) have been positioned so that their outer cylindrical faces are accurately adjusted to be equally distant from the axis of the main shaft 30. This may be accomplished as each foot in turn is brought opposite (by rotating the turntable 40) a fixed, external feeler guage, and the turnbuckle nut 53 is rotated until the surface in question just touches the guage. The lock nut 53(a) is then tightened, and all arm assemblies will have the same effective radial length.

Around the outside of the several feet 58 is fitted a band 64 of transparent plastic (such as methyl methacrylate) of sufficient thickness to be self supporting. The band 64 (Figure 3) is preformed approximately to conform with the circular positions of the outer surfaces of the feet 58, and thus forms a smooth arc surrounding the several feet. A hole in band 64 fits snugly over the indexing stud 61, so that this point of the band is maintained in a fixed angular position with respect to the turntable 40. The width of the plastic band 64 must be such as to extend beyond the upper surface of the feet 58 (Figure 4) by a distance at least equal to the width of the film 6, since the film 6 will later be mounted on this extension of band 64. The circumferential length of the plastic band 64 must be such that the ends will not overlap when the radial arms are adjusted to their shortest effective length.

Between the plastic band 64 and the feet 58 is inserted a band 64(a) (Figure 3) of spring steel (preferably stainless steel) about 1/32-inch in thickness, preformed to the general curvature as above, into which is punched a hole to clear the diameter of the indexing stud 61 (Figure 3). The metal band 64(a) is stiffer than the plastic band 64 and therefore forms a more nearly circular arc around the feet 58 and urges the plastic band 64 outward to the desired curvature.

A narrow metal band 64(b), approximately 1/64-inch thick, is wound around the outside of the plastic band 64 (Figure 4). The ends of the outer metal band 64(b) are turned outward slightly and perforated. A tension spring 65 is hooked into the perforated ends of metal band 64(b). The spring 65 is of sufficient strength to pull the ends of the outer band 64(b) toward each other to cause the inner band 64(a) to contact each of the feet 58. The plastic band 64, the lower portion of which being sandwiched between the bands 64(a) and 64(b), will then acquire a smooth, substantially cylindrical configuration over its entire length.

A scratch 220 (Figure 4) is made on the outer side of the plastic band 64 parallel to the axis of shaft 30 and at the center line of the indexing stud 61. This scratch serves as a zero mark to which reference will be made later. It will become evident that the angular orientation of the drum 32 and the turntable 40 must be such that the slot 200 in the drum 32 is positioned at an angle slightly greater than 90° counterclockwise (i.e., in the direction of rotation) with respect to the indexing stud 61 and the scratch 220, as indicated in Figure 3.

The feet 58 may be moved radially inward or outward in unison. The inner end of each of the rods 51 is pressed into hole 67 of a block 66 (Figure 4), mentioned previously, securely held together by a tight press fit. Each block 66 has a conical inner surface 68. The blocks are conveniently cut from an annular piece of material which has previously been bored with the conical inner surface. A conical expander 69 slides over shaft 30 and bears against the conical surfaces 68 of blocks 66. A knurled adjusting nut 70 is screwed onto the threaded upper end of shaft 30, and the nut 70 bears against the expander 69. It is thus apparent that the springs 57 in the respective arm assemblies hold the arms inward against the expander 69 which in turn is held by nut 70. When the nut 70 is loosened (or raised), the expander 69 is forced to rise by the action of the springs 57 and the arm assemblies move inward, i.e. reducing their effective radius. On the other hand, when the nut 70 is tightened (or lowered), the expander 69 is driven downward, pushing the arm assemblies outward against the springs 57. In this manner the radius of the plastic band 64 may be increased or decreased as desired, the radial arms moving in unison by rotation of the adjusting nut 70 relative to shaft 30. As such adjustments are made, the angular position of the scratch 220 on band 64 remains fixed at the indexing stud 61. The band 64 may slip at the outer ends of all the other radial arms so as to accommodate itself circumferentially.

The above-described apparatus permits adjusting the radius of the plastic band 64. Within the limits of the adjustments provided a given length on the band 64 can be made to subtend any desired central angle relative to the shaft 30. In operation, the prepared film 6 is wrapped around the outer cylindrical surface of the band 64. In originally making a set of seismograms it is most likely that some nominal fixed speed was employed and that subsequent dimensional changes were uniform, with the result that the films 6 will, for any given seismic project, have approximately the same timing and will vary only slightly. Ordinarily, only small corrections are required, and can generally be made by simply adjusting nut 70.

The band 64 has a previously mentioned vertical scratch 220 (Figure 4) accurately parallel to the axis of the shaft 30 and through the center line of the radius arm 60 at indexing stud 61. Because of the restraint of the band 64 by the indexing stud 61, the scratch 220 always bears the same angular position with respect to shaft 30 and elements mounted thereon, regardless of the adjustment of the nut 70 or any of the nuts 53. A set of studs 221, shown on Figures 3 and 4, are suitably spaced around the periphery of the band 64 close to the upper edge of the metal band 64(b). When a prepared film 6 is mounted on the plastic band 64, the lower edge rests against the upper surfaces of the studs 221, which act as positioning guides. The film 6 is mounted on the plastic band 64 with the matte surface inward and the time-break line 8 (Figure 2) in coincidence with the scratch 220 (Figure 4), the increasing time direction on film 6 proceeding clockwise (Figure 3) around the plastic band 64. The manner in which the film 6 is mounted is dependent upon the direction conventions which may be adopted for a particular application, and the method described herein is consistent with the procedure for preparation of the film 6 and operation of the apparatus to be described. The film 6 is conveniently held on the plastic band 64 by pressure-sensitive adhesive tape attached to each end, and is easily removed after the film 6 is run.

By the procedure described, it is apparent that all seismic signals on the film 6 will be reproduced in time relative to the scratch 220. In the photograph recording process, the position of the scratch 220 is made to be clearly reproduced by means of a special timing film on at least one variable-density track of film 102, thus becoming the point of zero time on the completed variable-density seismogram.

On the outer portion of turntable 40 at equal central-angle intervals, there are engraved radial lines 222 (Figure 3) directed toward the axis of shaft 30. One of the lines 222 is oriented accurately in the vertical plane defined by the center of the indexing stud 61 and the vertical scratch aligned therewith. It is apparent that the circumferential length of band 64 must be at least as great as the length of the longest film 6 to be accommodated. For example, if it is desired to accommodate reflection seismograph records having recorded events not exceeding four seconds after the time break, it is convenient to place the lines 222 at 90° central-angle intervals, and to let this angle represent one second of recorded time. By adjustment of the knurled nut 70, the radial arms may be moved inward or outward, consequently altering the effective diameter of the plastic band 64, so that the lines, such as 9 and 10 in Figure 2 which indicate the one-second time intervals on a particular film 6, are brought into alignment with the respective radial lines 222. By use of a small transparent drafting triangle, the position of the radial lines 222 may be extended vertically along the surface of the band 64 for facilitating this alignment. Thus, the angle of 90° subtended by the turntable 40 and shaft 30 represents one second of recording time on the film 6, and consequently one second of recording time on the original seismogram 1 from which the film 6 was prepared.

The apparatus reproduces the seismic signals of the film 6 now mounted on the band 64 and exposes the seismic signals in variable-density form onto the photographic film 102 placed on the drum 32, which it will be recalled is mounted on shaft 30 and rotates as a unit with turntable 40. It is now evident that the diameter of drum 32 determines the time scale at which the photographic film 102 will be reproduced. In the particular embodiment herein described, the drum diameter is chosen so that a desired mean length of film 102 subtends an angle of 90° with respect to the axis of shaft 30, which angle as mentioned above represents one second of recording time. Consequently, the desired mean length of film 102 corresponds to one second of recording time on the film 6 or on the seismogram 1. If the variable-density film 102 is to be used on the seismic profile printer previously mentioned, the desired mean length of film 102 which subtends the angle of 90° is made equal to five inches, resulting in the time scale of five inches of record for one second of time, for which the printer is designed to operate. It will be apparent to those skilled in the art that other time scales may be achieved by varying the design parameters, and for exceptionally long films 6, the film 6 may be cut into shorter portions and these portions run separately.

Due to differential timing in the paper seismogram 1, as noted previously, the linear distances corresponding to one-second intervals 8 to 9, 9 to 10, etc., on films 6 (Figure 2) may not be exactly equal. These variations may be compensated for to a certain extent by individual adjustment of the radial arms by means of the turnbuckles 53, thereby warping the otherwise cylindrical surface of the plastic band 64. For this purpose, additional engraved radial lines such as 222 on Figure 3 may be added to the turntable 40 and additional lines such as 9 and 10 (Figure 2) may be drawn on the prepared film 6, as for example at 0.5, 1.5, 2.5, etc., seconds. In cases of extreme variations, a practical expedient is to first mark off nominally equally spaced lines such as 9 and 10 on film 6 before the seismogram is copied, as for example at one-tenth second intervals, and then progressively shift the film 6 with respect to the seismogram 1 as the seismic signals are copied onto the film 6. In this manner erratic time variations can be normalized, and the prepared films 6 are then suitable for use on the cylindrical surface of the plastic band 64, whose diameter is appropriately adjusted, as described, by the adjusting nut 70.

The manner in which the apparatus reproduces the seismic signals in variable-density form from the prepared film 6 will now be described. This is best understood by reference to Figure 4 in which it is assumed that the film 6 has been mounted on the outer cylindrical surface of the transparent plastic band 64. Light from an incandescent lamp 75 passes through the lens 90 and the aperture 76, and falls onto the moving mirror (not shown) of an oscillograph 77. After reflection the light passes through the plastic band 64, film 6, and the lens 78, and activates the sensitive element of a phototube 79. By means of a tracking circuit to be described later, the light beam reflected from the oscillograph mirror is constrained to follow the upper boundary of the opaque stripe of the seismic trace previously copied onto film 6. The above-outlined optical system is supported on a pedestal 80 whose center is bored out to accommodate electrical wiring as indicated by 81. The pedestal is mounted on the top plate 23 by means of screws as shown. A housing 82, having an overhanging extension 83, is mounted on the pedestal 80. The housing 82—83 holds the oscillograph lamp 75 in an adjustable socket 84. The lamp 75, the lens 90 and the mask 76, having a rectangular aperture, are supported as a unit within the housing 83. The vertical dimension of the mask opening is nominal, being about ⅛-inch, and its dimension perpendicular to the plane of Figure 4 is smaller, on the order of 0.010″. A light baffle 85 restricts stray light from entering the lower compartment 82.

The overhanging portion 83 of the housing clears the band 64 holding the prepared film 6. At the inner end of the housing is an oscillograph bracket 86, which is split at 91 to clamp the generally cylindrical oscillograph unit 77, the bracket being mounted in conventional manner with adjustment clamping screws 87. The oscillograph element proper is mounted in the unit 77, the suspension axis of the element being perpendicular to the plane of Figure 4, and the oscillograph suspension is equipped with an adjusting device 88. The mirror attached to the oscillograph element is concave, and on its surface is formed an enlarged image of the filament of the lamp 75 as focussed by the lens 90. The concave mirror reflects the incident light along an axis, as indicated by 93, and focusses the rectangular opening of the illuminated aperture mask 76 onto the film 6, forming a rectangular spot of light as indicated at 223. The reflected light passes through an opening in the housing at 89. The lens 78 forms an image of the illuminated concave mirror onto a relatively small area of the photosensitive surface of the phototube 79 when the film 6 is not in position on the band 64. When the film 6 is in position, however, the matte surface diffuses this image over an appreciable area of the photosensitive surface of the phototube. Although the rectangular spot of light 223 may move up and down on the film 6 under control of the oscillograph current, the diffuse image of the oscillograph mirror remains in essentially fixed position on the photosensitive surface of the phototube. In this way the phototube response is independent of regional variation in the sensitivity of the photosensitive surface. The image of the aperture in the mask 76, which is reduced in size, is oriented so that the spot 223 falling on the film 6 is very narrow in the direction of motion of the film 6 (i.e., perpendicular to the plane of Figures 4 and 9). In the optical system, as described, the diameter of the lens 78 is somewhat greater in the plane of Figure 4 than the total upward and downward range of motion of the spot 223. Inasmuch as the diameter of the band 64 is adjustable, as described above, any section of the band 64 intersecting the optical axis 230, as that shown in cross-section in Figure 4, can move to a position somewhat left or right of the position shown. However, the spot of light 223 formed on the film 6 changes but slightly in dimension and sharpness as the diameter of the band 6 is altered, and the reproduced signal is inappreciably affected.

As the shaft 30 is rotated, the reflected light beam 93 from the oscillograph 77 is made to follow the upper boundary (according to the conventions adopted previously) of the opaque stripe on the film 6. The circuit by which this is accomplished is described with reference to Figure 9, in which correspondingly numbered elements have the same function as in Figures 3 and 4. In principle, the reflected beam 93, falling on the phototube 79, elicits an electrical signal from the phototube 79. The circuit comprising the phototube 79, an amplifier 92, and the oscillograph 77 maintains the light spot 223 in an equilibrium position such that the spot is partially vignetted and the oscillograph current varies according to the seismic signals copied on film 6, i.e., as recorded on the original seismogram 1. The signals derived from the fluctuating oscillograph current are simultaneously recorded onto the photographic film 102 by the lamp 100.

Figure 9:
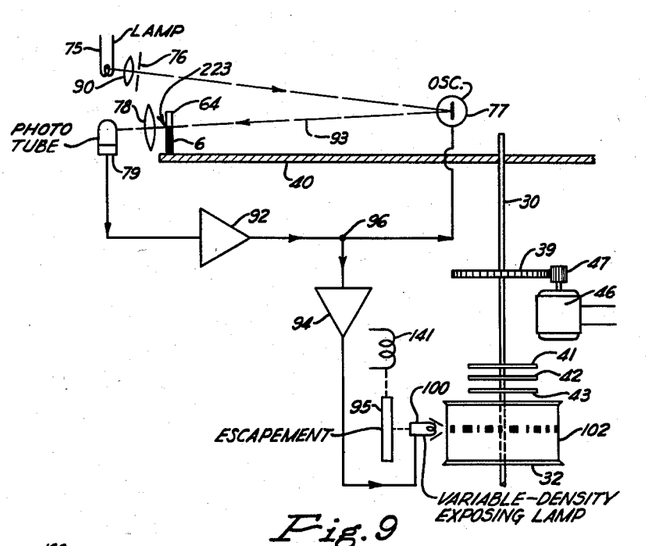
Figure 9 is a schematic diagram of the apparatus of this invention.

The amplifier 92 is a conventional D.-C. amplifier. Its input circuit is designed for operation in conjunction with the particular phototube 79 employed. For example, in the present embodiment the phototube 79 is a type CE-2 with a load resistor of 2.5 megohms. The amplifier comprises two stages. The first stage is a so-called grounded-grid amplifier employing a type 5692 tube. Direct coupled to this is a second stage employing a second type 5692 tube with both sections in parallel and with the oscillograph 77 connected in the cathode circuit. The oscillograph employed in the present embodiment is a D'Arsonval type element having a natural (undamped) frequency of 220 cycles per second operated at 0.7 critical damping and having a resistance of 1000 ohms and a sensitivity of approximately 0.025 radians reflected light beam deflection per milliampere. The oscillograph carries a concave (75 mm. focal length)

mirror of dimensions approximately 1/8" x 3/8" which provides ample reflected light. These characteristic values are given by way of example and it is apparent that other equivalent components may alternatively be employed. The circuit comprising the phototube 79, amplifier 92, and oscillograph 77 is substantially drift free because of the closed loop existing from the phototube through the amplifier and the oscillograph and back to the phototube via the oscillograph light beam.

If the illuminated spot 223 were directed onto a clear area of the film 6, maximum illumination would fall onto phototube 79, and in such a case the output current of the amplifier 92, feeding into oscillograph 77, is of such magnitude and direction as to deflect the reflected beam 93 downward, i.e., toward the opaque part of the film 6. When the spot 223 enters into the opaque stripe, illumination on the phototube 79 decreases and further deflection of the beam is halted. When the stripe is near the bottom of the film 6, most of the spot will be above the stripe and consequently the oscillograph current is large; and when the stripe is near the top of the film, less of the spot will be above the stripe and the oscillograph current is proportionately reduced. Thus, equilibrium is established by the amount of light striking the phototube. Owing to rotation of the turntable 40 and the varying signals copied on the film 6, it is apparent that when the stripe moves downward increased illumination of the phototube results in increased downward deflection of the beam 93, and vice versa, and consequently the spot 223 continually follows the upper boundary of the opaque stripe on the film 6. The small horizontal dimension of the spot 223 (perpendicular to the plane of Figures 4 and 9) permits the spot to follow rapidly changing excursions of the signal on film 6.

Again with reference to Figure 9, the output signal from the amplifier 92 is also fed into an amplifier 94. Amplifier 94 contains two stages of A.-C. amplification for which the two elements of a double-element vacuum tube 12AX7 are employed in conventional manner. In order to provide gain adjustment the input circuit comprises a potentiometer acting as a voltage divider whose sliding contact is connected to the grid of the first element of the tube 12AX7. The output of the second stage is capacitor coupled to a 12AY7 vacuum tube whose elements are connected in parallel. The output of the 12AY7 tube is coupled to the primary of the output transformer whose secondary is connected to a circuit containing the exposing lamp 100 shown in Figure 9. The grid circuit of the 12AY7 tube contains a frequency-selective network and has a feedback connection from the plates of the 12AY7 tube, which arrangement is conventional for the purpose of providing an increase of the output signal with increasing frequency. This is desired in order to compensate for the frequency characteristic of the exposing lamp 100, so that signals of equal amplitude at various frequencies on the prepared film 6 will cause equal brightness variations of the lamp 100. Details of the coupling of the secondary of the output transformer of amplifier 94 to the lamp 100 will be discussed later with reference to Figure 10.

Light from the lamp 100 falls on the photographic film 102 previously placed on the drum 32 and exposes a variable-density track in well-known manner as described for example in Rieber Patent No. 2,051,153. During exposure of the photographic film 102, a D.-C. bias current (not shown in Figure 9), sufficient to produce a moderate gray density on the finished record, flows through the lamp 100. The output of the amplifier 94 modulates the otherwise steady bias current, and thus the intensity of the lamp 100 varies. Portions of the finished record track denser than the no-signal level correspond to higher lamp currents, and vice versa. Phasing of the various connections through the amplifier 94 and polarity of the bias current through the lamp 100 is arbitrary. For example, if the output from the amplifier 94 for a downward excursion of the tracing beam 93 is in the same direction as the bias current through the lamp 100, the brightness of the lamp 100 increases, resulting in increased exposure on the variable-density track. It is apparent that reversing the output of the amplifier 94 will reverse the phasing on the finished variable-density track, if desired, but of course a consistent system is customarily adhered to during the study of any one seismic project. Alternatively, instead of a lamp 100 whose brightness is varied by the signal passing through its filament, an electromechanical gate actuated by the signal from amplifier 94 may be employed to modulate the illumination from a source of light and a variable-density track may be made by such means in well-known manner.

Figure 6:
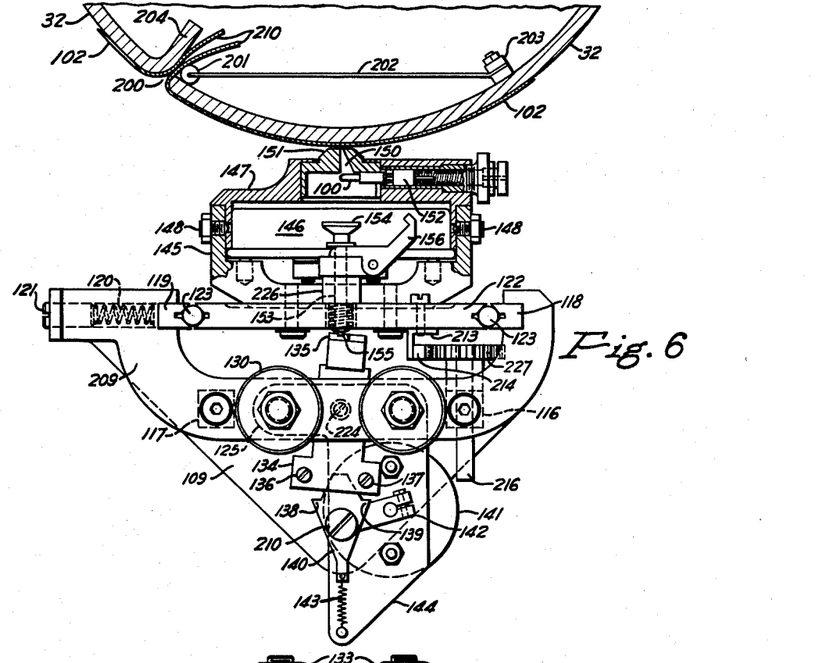
Figure 6 is a plan view of that portion of the apparatus of Figure 4 whose function is to so position the variable-density recording means that the resulting variable-density tracks are placed in proper consecutive order on the multi-trace variable-density record.

At the top of Figure 6 a section of the drum 32 is shown with the photographic film 102 mounted thereon. The slot 200 and the manner in which the ends 210 of the film 102 are fastened is also shown in Figure 6. The film 102 is wound on the drum 32 emulsion side out, and both ends 210 of the film 102 are inserted through the slot 200. A cylinder 201 is mounted on a cantilever leaf spring 202, which is fastened to the inside surface of the drum at 203. The length of the spring arm 202 is such that the cylinder 201 contacts an inward extension 204 of the drum. By depressing the spring with his finger, the operator bends the spring toward the inner surface of the drum 32. The cylinder 201 moves away from the extension 204, and permits insertion of the film ends 210. Upon being released, the spring exerts through the cylinder 201 a clamping force on the film against the extension 204 and this clamps the film 102 tightly in place on the drum.

The mounting of the exposing lamp 100 and the escapement mechanism 95 (Figure 9) will now be explained with reference to Figures 6, 7, and 8. The lamp 100 is carried inside a housing which moves vertically, parallel to the shaft 30, and which may be dropped in discrete increments under control of the mechanism 95 and a solenoid shown as 141, as will be explained. The general outline of the assembly is indicated by the dashed lines 97 in the lower central part of Figure 3. The plane through shaft 30 which contains the exposing lamp 100 is displaced 90° with respect to the plane containing the oscillograph light beam 93 previously described. The assembly occupies a position in front of the drum 32, and therefore is not shown in Figure 4. Figure 6 shows a plan view of the lamp mounting and escapement mechanism. A frame (shown in the lower half of Figure 6 and in Figure 7) is fastened to the base plate 21, and is held securely by means of a clamping plate 115 and screws 215, as shown at the bottom of Figure 7.

Figure 7:
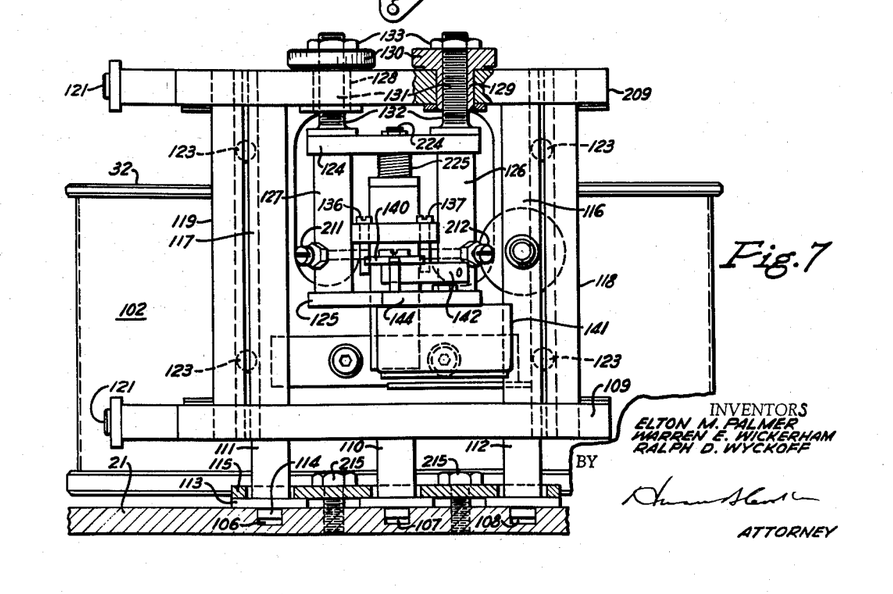
Figure 7 is a rear view in elevation of that portion of the apparatus shown in Figure 6.

With reference to Figure 7, the base plate 21 has three slots 106, 107, and 108 whose longitudinal extension is perpendicular to the planes of Figures 7 and 4. The center slot 107 (Figure 3) is on a center line that passes through the axis of shaft 30, and lies at 90° to the plane of the light beam 93. The other two slots 106 and 108 are parallel to the slot 107. The frame of the assembly comprises two generally U-shaped end plates 109 and 209 (Figures 6 and 7), which are held in fixed spaced relation by vertical posts 116 and 117. The frame is supported on legs 110, 111, and 112, which are fixed to the lower end plate 109. Each of these legs has an enlargement at its base as shown by 113 and a short extension 114 which fits into one of the parallel grooves 106, 107, and 108 in the base plate 21. The clamping plate 115 (Figure 7), having large holes through which the legs pass, is clamped to the base plate 21 by means of screws 215 as mentioned previously, and when the screws 215 are tightened, the clamping plate 115 holds the enlargements 113 against the base plate, thus holding the entire assembly firmly in position. Adjustment is made by loosening the screws 215 and sliding the assembly toward or away from the drum 32. The assembly is normally adjusted so that, with the film 102 in place on drum 32, the lamp housing is very close to but does not rub on the surface of the film as the drum rotates, or as the lamp housing is moved up and down.

The end plates 109 and 209 (Figures 6 and 7) at the right-hand outer extremity carry a grooved ball track 118, which is fastened thereto. On the opposite arm of the U, the plates 109 and 209 are slotted to carry a similar grooved ball track 119. The track 119 is urged toward the track 118 by means of springs 120 and spring-retainer screws 121. The lamp mounting proper is carried on a plate 122 which rolls on balls 123. The plate 122 has grooved ball tracks on the edges facing the tracks 118 and 119, respectively, so that the plate 122 and all parts mounted thereon are thus restrained to move in accurate azimuthal orientation with respect to the shaft 30. The parts mounted on the plate 122 will be described later.

In the space between the vertical posts 116 and 117 there is mounted a smaller generally rectangular frame (shown in the center of Figure 7) comprising upper bar 124 and lower plate 125 (having an extension 144 shown in Figure 6), and spacer posts 126 and 127 fastened thereto. This inner frame carries the escapement mechanism which determines the vertical positioning of the plate 122 and the lamp housing, as will become evident. The frame is fastened to the upper end plate 209 by a pair of adjustable bushings 128 and 129. These bushings are freely rotatable in the plate 209, and each bushing terminates at its upper end as a knurled adjusting knob 130. The bushings are drilled and tapped at 131, and engage threaded rods 132. The rods 132 are rigidly fastened to the frame 124, 125, 126, 127. It is apparent that the knobs 130, when rotated, will raise or lower the rods 132 and the rectangular frame 124, 125, 126, 127, with respect to the upper end plate 209, and permit accurate vertical positioning of the escapement mechanism with respect to the drum 32. Lock nuts 133 are provided to clamp this adjustment.

Pivoted on vertically opposed pivots 224 (only the upper of which is shown) in the rectangular frame 124, 125, 126, 127 is a T-shaped lever 134 (Figure 6). At the upper end of the leg of the T-lever there is fastened an escapement rack 135, shown in detail in Figure 8, to be described more fully later. A compressed helical spring 225 (Figure 7), placed between the T-lever 134 and the upper bar 124, serves to load a friction device which holds the T-lever in any given position. The cross bar of the T has two tapped holes into which are screwed two vertical pins 136 and 137 which may be engaged by the ears 138 and 139 of a dog 140, whose purpose is to rock the T-lever 134 to and fro on its pivots 224. The dog 140 is pivoted on the arm 142 by means of screw 210. The solenoid 141, which is fastened to the frame extension 144, is electrically controlled and, when actuated, rotates the arm 142. The dog 140 is held in a center position by means of tension spring 143 which is anchored to the plate 144, as shown. Upon actuation of the solenoid 141, one of the ears 138 or 139 will engage one of the pins 136 or 137, respectively. For example, if the T-lever is in the position illustrated in Figure 6, actuation of the solenoid rotates the arm 142, and the dog 140 moves toward the T-lever. The geometry of the dog is such that ear 139 catches on pin 137, and the dog will tend to rotate clockwise. The design is such that in this case the ear 138 cannot engage the pin 136. Further rotation of the arm 142 effected by the solenoid then serves to push the pin 137 and the T-lever to the right, thus effecting counterclockwise rotation of the T-lever about its pivot 224. Upon release of the solenoid, the dog returns to the position shown in Figure 6, but the T-lever remains in its displaced position. At the next succeeding actuation of the solenoid 141, the ear 138 will catch pin 136, rotating the T-lever clockwise, whereby the T-lever returns to the position shown in Figure 6. Two adjustable stop screws 211 and 212, shown in Figure 7, serve to limit right and left rotation of the T-lever.

With reference to the movable part of the assembly which is mounted on the plate 122, there is fastened to the plate a yoke 145 (Figure 6) to which the lamp housing 147 is held in position by means of screws 148. The incandescent lamp 100 is mounted in the housing, as shown, behind a tapered light-collimating slit 150 in a tapered nose piece 151. A spring-loaded connector 152 makes electrical contact to the pins of the lamp 100, and is connected to the amplifier 94 by means of wires not shown in Figure 6. Light from the lamp 100 passes out through slit 150 and falls on the photographic film 102 wound on drum 32, exposing a variable-density track on the film. The light from the lamp 100 also falls on a photovoltaic cell 146, which occupies a recess in the rear of the lamp housing, and is connected by means of wires (not shown in Figure 6) to a monitoring circuit which will be described later. Fastened to the plate 122 above the lamp housing yoke 145 is a bushing 226 which has a sliding plunger 153, pressed by a spring in conventional manner toward the T-lever 134. The outer end of the plunger has a small knob 154. The inner end of the plunger terminates in a round pin 155. A bell crank 156 is pivoted on the plunger bushing 226, as shown, and may be used to retract the plunger 153 manually. The pin 155 engages an escapement rack which restrains the movable assembly in any of a series of vertical positions, as will be explained.

Figure 8:
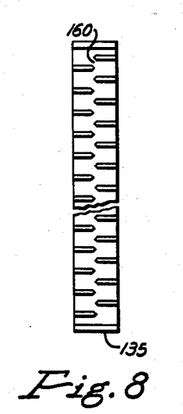
Figure 8 shows in detail the escapement rack employed for transversely advancing the variable-density recording means.

The escapement rack 135, shown in Figure 8, serves as a ladder and actually comprises two similar racks displaced by one-half of the tooth pitch. The ends of the teeth of the respective racks are beveled slightly at the junction of the racks so as to provide a space 160 through which the plunger pin 155 may pass (see Figure 8). As the rack 135 is moved from one side to the other by rocking of the T-lever 134, the pin 155 drops from the tooth of one rack to the next lower tooth of the adjoining rack, thus lowering the movable assembly by one-half the rack pitch upon each actuation of the solenoid 141. The rack is so proportioned that the distance through which the movable assembly falls by the force of gravity, each time the rack is actuated, is equal to the desired spacing of the variable-density tracks to be recorded on film 102 on drum 32.

To the back of plate 122 there is fastened, by means of screws, an angle 213 and to this is fastened a gear rack 214. The rack 214 is engaged by a gear 227 fastened to a shaft 216, which is journaled in the vertical spacer post 116. As the plate 122 moves vertically in its ball guides, the track 214 rotates the gear 215. A flexible cable connection (not shown) from the shaft 216 extends through the outside wall of the apparatus case 20 and is connected to a dial indicator (not shown). Each step on the indicator corresponds to a step on the escapement rack 135. For example, in the apparatus of this invention the escapement rack 135 is designed to produce twenty-seven steps from the upper position of the lamp housing close to the upper flange of the drum 32 to the lower position of the lamp housing close to the lower flange of the drum 32. The gear rack 214 and the gear 227 are thus designed so that in cooperation with the dial indicator connected to the shaft 216, the dial shows the track number (in order reading downward) on which the lamp housing is positioned on the escapement rack 135, and provides means for the operator to observe this number remotely. The dial indicator is not shown on the drawings since it is of conventional form. An electrical pilot light for the apparatus is conveniently combined with the dial indicator outside the case.

Figure 10:
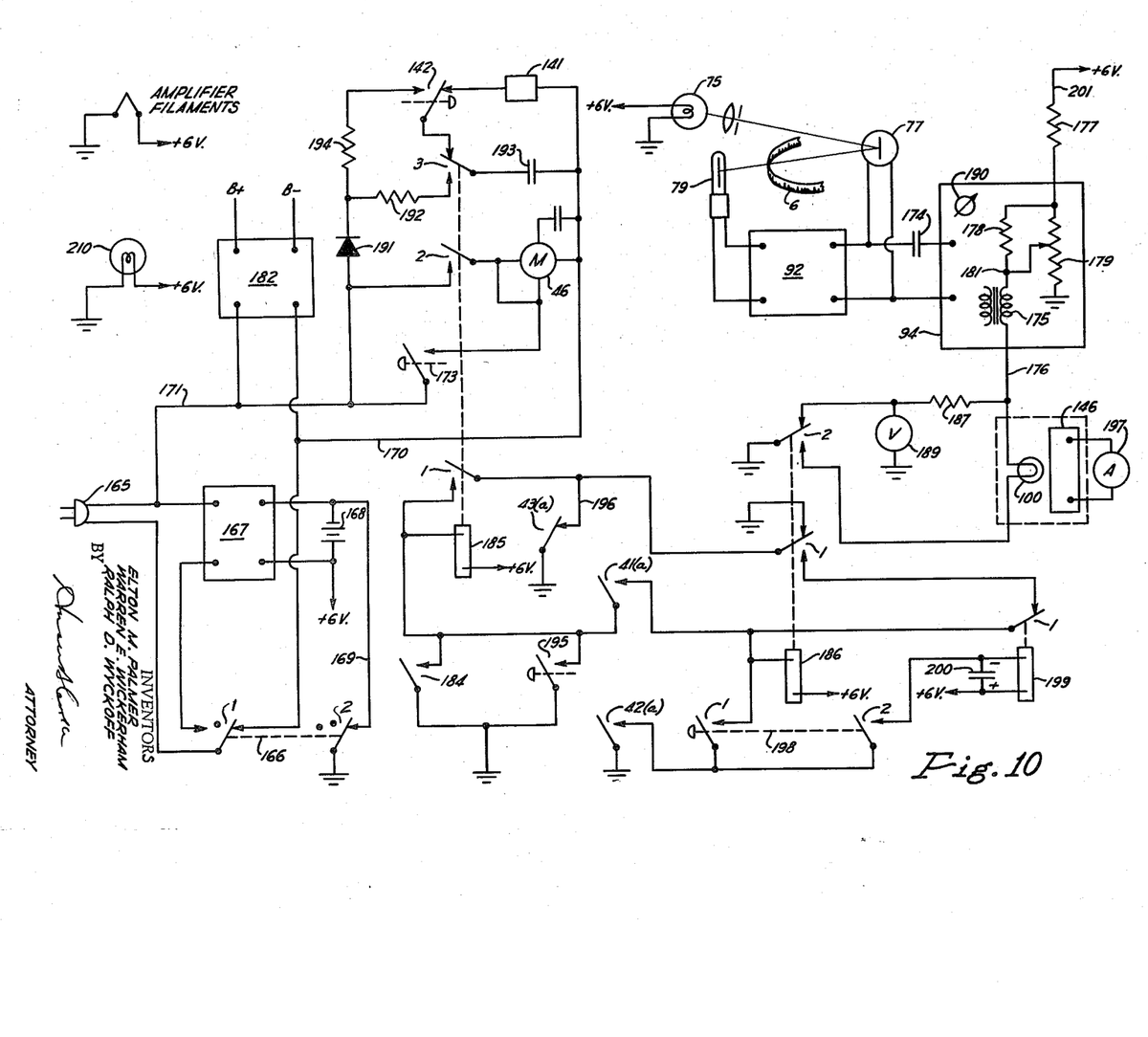
Figure 10 is an electrical wiring diagram of the apparatus of this invention.

Figure 10 shows a wiring diagram of the circuits controlling operation of the invention. It is apparent that after the prepared film 6 has been put into position on the plastic band 64 as previously described, the turntable 40 may be rotated and the oscillograph spot 223 will follow the prepared stripe on the film 6. Operation of the exposing lamp 100 must be coordinated with rotation of the drum 32 so that the lamp 100 will operate at the proper time and for only one revolution of the drum 32 when exposing a track, since otherwise the photographic film 102 would be fogged or unduly exposed. In addition, certain check functions are provided in the control circuits. These various operations will become clear in the following description of Figure 10.

The apparatus is powered from 60-cycle house current through a conventional attachment plug 165. The A.-C. supply voltage is controlled by the power switch 166, which has a center "Off" position. When the switch 166 is thrown to the left, the contact 166-1 connects the supply voltage to a battery charger 167 which serves to charge a 6-volt storage battery 168. When the switch 166 is thrown to the right or "On" position, contact 166-1 places the supply voltage on a regulated B-voltage supply unit 182, which is connected between leads 170 and 171. The D.-C. output of the B-voltage unit 182 supplies voltage for the vacuum tubes of the amplifiers 92 and 94 and the phototube 79. Contact 166-2 connects the negative side of the 6-volt battery 168 to ground through lead 169, and the filaments of the vacuum tubes of the amplifiers 92 and 94, connected for 6-volt operation, are thereupon heated. The +6-volt connections and the B-supply connections are omitted from Figure 10 in the interest of simplifying the diagram. All leads marked +6 v. are to be understood as connected to the +6 v. terminal of the battery 168. A pilot light 210 indicates that the apparatus is turned on and also illuminates the escapement dial.

The motor 46, which may be a capacitor-type split-phase synchronous motor rotating at 1800 r.p.m., is connected to the lead 170 and to lead 171 through a make contact of relay 185 to be discussed later, or through a push-button switch 173, which permits the operator to run the motor at will. The gearing between the motor pinion 47 (Figure 4) and the turntable gear 39 is appropriately designed for use with the motor 46. For example, the turntable 40 and the drum 32 may rotate during the exposing cycle at a steady rate chosen to be one revolution in eight seconds.

The beam of light from the oscillograph lamp 75 shines onto the mirror of oscillograph 77 where it is reflected (as previously described and as indicated schematically in Figure 10, and passes through the prepared film 6 to the phototube 79. The phototube 79 is connected to the amplifier 92 whose output (which corresponds to the varying signals on the prepared stripe on the film 6 and is fed to the oscillograph 77 as previously described) is coupled through capacitor 174 to the input terminals of the amplifier 94. Amplifier 94, whose function was previously described, includes a potentiometer 190 for gain adjustment. The output transformer of the amplifier 94 is indicated in Figure 10 by 175. One terminal of the secondary of the output transformer 175 is fed to lead 176, thence to the exposing lamp 100 and through the contact of a relay, whose operation will be described later, to ground. The other terminal 181 of the secondary of the output transformer 175 is connected to a resistance network and by lead 201 to the 6-volt battery 168. The network 177, 178, 179 serves to introduce the bias current into the lamp circuit, and the potentiometer 179 provides for adjustment of the bias current.

Automatic operation of the apparatus will now be described. Assuming that a prepared film 6 has been placed on the plastic band 64 and an unexposed photographic film 102 placed on the drum 32, and that the switch 166 is turned to the "On" position (right-hand position as shown in Figure 10), the apparatus is started by momentary closing of the push-button switch 195. This energizes relay 185, whose contact groups are designated as 185-1, 185-2, and 185-3, and actuation of relay 185 closes the three make contacts. The closing of the make contact 185-2 starts the motor 46, which drives the shaft 30 and the rotating system comprising turntable 40, drum 32, and other elements mounted thereon. At the same time, make contact 185-1 closes, and this completes a circuit through the lead 196 and the closed cam-operated switch 43(a) to ground so that the relay 185 is locked in the energized position. Motor 46 continues to rotate the system and at a certain angular orientation of the system the cam 41 (Figure 4) momentarily closes the switch 41(a), thereby energizing the relay 186. Make contact 186-1 then closes and completes a circuit from the coil of the relay 186 through the closed break contact 199-1, the now-closed make contact 186-1, lead 196, and the closed switch 43(a) to ground, thereby locking the relay 186 in the energized position. At the same time, the closed make contact 186-2 connects the exposing lamp 100 to ground, and the lamp 100 lights. Meanwhile the oscillograph spot 223 is following the stripe on the prepared film 6, and the output of the amplifier 94 is thus impressed on the lamp 100 which exposes the film 102 on the drum 32. The angular orientation of the system when these events occur is determined by the angular adjustment of the position of the switch 41(a) with respect to the cam 41 on the shaft 30. The adjustment is such that the switch (41a) closes slightly ahead of the passage across the lamp housing of the slot 200 in the drum 32, which assures that the lamp 100 will be lighted in time to start exposure at the beginning end of the film 102. Simultaneous opening of the break contact 186-2 removes ground from the resistor 187, whose purpose is to substitute for the lamp 100 when the circuit is in standby condition, thereby stabilizing the voltage of the battery 168 when the lamp 100 is not lighted, and also removes the shunt path from the voltmeter 189. During the exposure the voltmeter 189, which is preferably an A.-C. vacuum-tube voltmeter of adequate sensitivity, indicates the signal voltage impressed upon the lamp 100, resistor 187 now in series with the voltmeter being of too low a resistance to appreciably affect the reading of the high impedance meter. Meanwhile, the photovoltaic cell 146 generates a current which is read on microammeter 197. Thus, during the exposure, the operator may monitor the light output from the lamp 100 on the meter 197, as well as monitor the signal applied to the lamp filament on the meter 189.

At the end of one operational revolution of drum 32, the cam 43 momentarily opens the switch 43(a), as determined by the angular adjustment of the position of the switch 43(a) with respect to the cam 43 on the shaft 30. The switch 43(a) opens slightly ahead of the closing of the switch 41(a), as mentioned previously, which assures that the lamp 100 will be extinguished prior to the beginning of the succeeding revolution of the drum 32. When switch 43(a) opens, the ground on the lead 196 is broken, whereby the holding circuit through the closed make contact 185-1 is broken and the relay 185 releases. Upon opening of the make contact 185-2, the motor 46 and the rotating system stop. Opening of the switch 43(a) also removes ground from the circuit through the closed make contact 186-1, which has held the relay 186 energized. Consequently, the relay 186 releases and contact 186-2 opens the circuit through the lamp 100, and restores ground to the dummy resistor 187, and shorts the voltmeter 189. The effect of this sequence of operations is thus to stop the rotating system and turn off the lamp 100.

Release of the relay 185 also operates the escapement mechanism to drop the lamp housing, as required, in the following manner. When, during the course of operation, the relay 185 was energized, the make contact 185–3 was closed and a connection from the lead 171 through the rectifier 191 and the resistor 192 was completed to charge the capacitor 193, the return path being through lead 170. When the relay 185 is released, the break contact 185–3 closes and connects the charged capacitor 193 to the escapement solenoid 141. Discharge of the capacitor 193 through the solenoid 141 advances the escapement one track-spacing unit as previously described.

It is apparent from the preceding description that regardless of the position in which the rotating system happens to be when the start button 195 is momentarily closed, the motor starts rotating the system. As the slot 200 on the drum 32 passes the lamp 100 (which would occur sometime preceding the passage of the scratch 220 on the plastic band 64 across the oscillograph spot 223), the lamp 100 begins to record, and upon completion of one recording revolution the lamp is extinguished. The apparatus is then in condition for exposure of the next track. The prepared film 6 is replaced by a new film, and the operation is repeated, this time with the lamp 100 recording on the next lower track on the drum 32. The escapement mechanism permits the exposing lamp and its housing to move in only one direction, namely downward. In order to reset the escapement, i.e., raise the lamp housing, the front door of the apparatus must be removed and the housing lifted by hand. The latter operation is normally done concurrently with the introduction of a new film on the drum 32.

It is desirable to be able to adjust the bias current through the lamp 100 when the apparatus is not recording and the front door is closed, and for this purpose a push-button switch 198 is provided. This switch is effective only when the rotating system is so oriented that the slot 200 in the drum 32 is opposite the lamp 100. When the drum is in this position with respect to the lamp, the lamp may be lighted without affecting the photographic film on the drum 32. A cam 42 on the main shaft 30 is arranged to close the switch 42(a) only at this point. Accordingly, before adjusting the lamp bias, the operator may hold the push-button switch 198 closed and rotate the turntable 40 manually until the cam-operated switch 42(a) closes. The switch 198–1 then closes the circuit to the relay 186, whose closed make contact 186–2 connects the lamp-bias current to the lamp 100 as previously explained. The microammeter 197 connected to photovoltaic cell 146 indicates the light output of the lamp 100. The closed make contact 186–1 establishes a holding ground for the relay 186, through the closed break contact 199–1 and the lead 196, as for the case of automatic control previously discussed; however, at the same time, the switch 198–2 closes a circuit which energizes the relay 199, and opening of the break contact 199–1 opens the holding circuit of the relay 186 so that, when switch 198 is subsequently opened, relay 186 is free to release. While holding the push button depressed, the operator may adjust the potentiometer 179 to give a desired reading on the microammeter 197, i.e., to establish a predetermined brightness level of the lamp 100. When the operator releases switch 198, the capacitor 200 discharges through the coil of the relay 199, thereby delaying closure of the break contact 199–1, the relay 186 releases, and the lamp 100 is extinguished.

Prior to loading of a photographic film 102 on the drum 32 and exposure of records in the apparatus, it is desirable to check the over-all gain of the recording system. This may be accomplished by placing a specially prepared film 6 on the plastic band 64 and operating the apparatus by means of the conveniently provided toggle switch 184 (Figure 10). The opaque stripe of the film 6 used for checking over-all gain is a signal of constant amplitude and suitable frequency, for example 60 c.p.s. When the toggle switch 184 is closed manually, relay 185 is energized. The rotating system and the recording circuits now operate as in the automatic case, except that rotation is not terminated by the periodic opening of the cam-operated switch 43(a), and the operator may adjust the gain of the system by rotation of the gain-control knob indicated as 190, setting the knob to give the desired indication on the voltmeter 189. Upon completion of the check, the apparatus returns to standby condition upon opening of the toggle switch 184 and subsequent opening of the cam-operated switch 43(a), as before.

The escapement mechanism may be advanced independent of the automatic control circuits by means of the push-button switch 142. When the push button is depressed, the switch is moved to the left, thereby completing a circuit from lead 171 through rectifier 191, resistor 194, and the closed break contact 185–3 to charge the capacitor 193. When the switch 142 is returned to its normal position, the charge from the capacitor 193 flows to the escapement solenoid 141, which actuates the escapement and causes the lamp housing to drop one track-spacing unit, as previously described.

Upon starting operation of the device, the operator places a length of the photographic film 102 on the drum 32, and raises the exposing lamp housing into the uppermost position on the escapement rack 135. The escapement dial indicator (which is connected to the shaft 216) should then read No. 1. The instrument case 20 is then closed. The foregoing preparatory steps are performed when the room is darkened, although a suitable photographic safelight may be lighted. After the case is closed, light cannot enter and fog the film on the drum 32, whereupon bright room lights may be turned on for the subsequent steps in exposing a complete variable-density record.

The operator now places a prepared film 6 on the plastic band 64 so that the time break line 8 falls on the scratch 220 (on the center line of fixed arm 61). The film 6 is conveniently held on the band, as previously mentioned, by means of pressure-sensitive adhesive tape. The radial arms are now adjusted, if necessary, so that the time marks, as 8, 9, 10, etc., on the film 6 will be in alignment with the corresponding radial lines 222 on the turntable 40. This is done as previously explained, by adjusting the nut 70 to move all of the arms in unison, or in rare cases by turning the individual turnbuckles 53 to adjust the radial arms individually. When this is completed, the apparatus is ready to reproduce the film 6 onto the photographic film 102. The main switch 166 is then turned to the "On" position, and after a brief warming-up period the apparatus is ready to run. Reproduction is initiated by the momentary depressing of the push-button switch 195. The motor 46 starts and drives the rotating system. When the beginning of the film 6 passes in front of the phototube 79 the automatic switching previously described effects one cycle of recording operation, and the motor stops. The operator will find that at the close of the sequence the escapement mechanism has lowered the exposing lamp housing to the proper position for track No. 2. The operator then removes the film 6 from the band 64, and places into position a new film 6, which is to be reproduced as track No. 2. This process is then continued for each track to be reproduced on the photographic film 102.

The timing pulses are exposed on the photographic film 102 in a similar manner as the previously-exposed seismic signals, and by means of a specially prepared timing film bearing suitable timing signals. This film is prepared by drawing a series of equally-spaced inked lines at right angles to the length of the matte-surfaced film, and spaced to represent 0.01 second or 0.1 second time intervals, as desired. The area leftward of a timing line near the left-hand end of the film is made opaque, and it is convenient to choose a timing line which falls in the vicinity of the position at which the line 8 would ordinarily be drawn on a similar film 6. The timing film is placed on the band 64 with the right-hand edge of the solid opaque area carefully aligned with the scratch 220 on the band 64, and reproduced in the normal manner. The timing lines and the representation of the time break appear as abrupt changes in photographic density on the corresponding track of the finished film 102. In practice, one such timing track is reproduced on each of the outermost tracks of the film 102, and the variable-density renditions of these lines are conveniently used in properly aligning the finished film 102 in subsequent operations, as for example in preparing a seismic profile.

With the room darkened, the operator may now open the apparatus case with aid of a safelight, if desired, and remove the film 102 from the drum 32 for conventional photographic processing. The completed record will contain all of the seismic signals displayed within the useable portion of the field seismogram 1, having been traced onto the several films 6, and then transferred in desired order to the photographic film 102. The completed variable-density record may now be used in association with other devices which perform appropriate computations or make desired visual presentations of the seismic events.

It is apparent that instead of photographic film 102 and exposing lamp 100, the apparatus of this invention may employ a magnetizable record tape and a magnetic recording head respectively. In such event the amplifier 94 is designed to operate into the particular magnetic recording head employed. The series of films 6 are thus converted into a multi-channel magnetic record. Some commercial types of seismogram analyzing devices employ such multi-channel magnetic records for various purposes, and the apparatus of this invention modified to use a magnetizable record tape and a magnetic recording head may be employed to convert spot-trace type seismograms into multi-channel magnetic records as described herein.

The apparatus of this invention has been described as applied to the making of reproducible records from spot-trace seismograms, but it is apparent that its utility is not limited to such use. The invention may be used to make reproductions of any record whose signals are represented by variations in the transverse position of a stripe. Thus, for example, the apparatus may be used to make a variable-density record or a magnetic record of spot-trace oscillograms taken in electrical power systems and the like. Another application is to convert well logs into reproducible form. Many other uses will be evident to those skilled in the art.

What we claim as our invention is:

1. Apparatus for converting a first record whose information is contained in the transverse position of a trace into a second record of fixed transverse width whose information is contained in the variation of a record parameter other than the transverse position of a trace and having a predetermined time scale which comprises a first drum of expandible radii, means for holding the first record on the cylindrical surface of said drum, means for adjusting the radii of said drum whereby a given time interval on the first record may be made to subtend a predetermined central angle of said drum, means for passing through the first record a penciliform light beam whose axis is in the same plane as the axis of said drum, means for moving the light beam transverse to the first record, servo means controlling said moving means maintaining the light beam on the signal trace of said first record, said servo means producing a varying electric signal having a characteristic representative of the displacement of said moving means, a second drum, means connected to said first drum and to said second drum rotating said drums in synchronism, means for holding a recording medium on said second drum, and means for recording on said recording medium in desired form the electric signal produced by said servo means.

2. Apparatus for converting a spot-trace-type transparent seismogram into a variable-density-type seismogram having a predetermined time scale which comprises a first drum of expandible radii, means for holding the spot-trace seismogram on the cylindrical surface of said drum, means for adjusting the radii of said drum whereby a given time interval on the spot-trace seismogram may be made to subtend a predetermined central angle of said drum, means for passing through the spot-trace seismogram a penciliform light beam whose axis is in the same plane as the axis of said drum, means for moving said light beam transverse to said spot-trace seismogram, servo means controlling said moving means maintaining said light beam on the signal edge of said spot-trace seismogram, said servo means producing a varying electric signal having a characteristic representative of the displacement of said moving means, a second drum, means connected to said first drum and to said second drum rotating said drums in synchronism, means for holding a recording medium on said second drum, and means for recording on said recording medium in variable-density form the electric signal produced by said servo means.

3. Apparatus for converting a spot-trace-type transparent seismogram into a variable-density-type seismogram having a predetermined time scale which comprises a first drum of expandible radii, means for holding the spot-trace seismogram on the cylindrical surface of said drum, means for adjusting the radii of said drum whereby a given time interval on the spot-trace seismogram may be made to subtend a predetermined central angle of said drum, means for passing through said spot-trace seismogram a penciliform light beam whose axis is in the same plane as the axis of said drum, means for moving said light beam transverse to said spot-trace seismogram, servo means controlling said moving means maintaining said light beam on the signal edge of said spot-trace semismogram, said servo means producing a varying electric signal in proportion to the displacement of said moving means, a second drum, means connected to said first drum and to said second drum rotating said drums in synchronism, means for holding a photographic recording medium on said second drum, an electric lamp mounted in proximity to said photographic recording medium, means connecting said lamp to said servo means whereby said signal energizes said lamp, and means for exposing a restricted portion of said photographic recording medium to the illumination from said lamp.

4. Apparatus for converting a spot-trace-type transparent seismogram into a variable-density-type seismogram having a predetermined time scale which comprises a first drum of expandible radii, means for holding the spot-trace seismogram on the cylindrical surface of said drum, means for adjusting the radii of said drum whereby a given time interval on the spot-trace seismogram may be made to subtend a predetermined central angle of said drum, a moving-mirror-type galvanometer whose axis of rotation is at right angles to the axis of said drum, a source of light shining on the mirror of said galvanometer, photoelectric means, means for mounting said galvanometer and said photoelectric means on opposite sides of said spot-trace seismogram so that the galvanometer beam passes through the spot-trace seismogram, circuit means connected to said photoelectric means and to said galvanometer and including amplifier means whereby the galvanometer current is controlled to maintain said galvanometer beam at the signal edge of the spot-trace seismogram, a second drum, means connected to said first drum and to said second drum rotating said drums in synchronism, means for holding a recording medium on said second drum, and means electrically connected to said circuit means recording on said recording medium in variable-density form a signal in accordance with the curent in said galvanometer.

5. Apparatus for converting a spot-trace-type transparent seismogram into a variable-density-type seismogram having a predetermined time scale which comprises a first drum of expandible radii, means for holding the spot-trace seismogram on the cylindrical surface of said drum, means for adjusting the radii of said drum whereby a given time interval on the spot-trace seismogram may be made to subtend a predetermined central angle of said drum, a moving-mirror type galvanometer whose axis of rotation is at right angles to the axis of said drum, a light beam impinging on the mirror of said galvanometer, photoelectric means, means supporting said galvanometer and said photoelectric means so that the light beam reflected from the mirror of said galvanometer traverses the spot-trace seismogram and impinges on said photoelectric means, electric circuit means connected to said photoelectric means and to said galvanometer and including amplifier means whereby the galvanometer current is controlled to maintain said light beam reflected from the mirror of said galvanometer at the signal edge of the spot-trace seismogram, a second drum, means connected to said first drum and to said second drum rotating said drums in synchronism, means for holding a photographic recording medium on said second drum, an electric lamp mounted in proximity to said photographic recording medium, means connecting said lamp to said circuit means adapted to supply to said lamp a signal in accordance with the current in said galvanometer, and means for exposing a restricted portion of said photographic recording medium to illumination from said lamp.

6. Apparatus for converting a spot-trace-type transparent seismogram into a variable-density-type seismogram having a predetermined time scale which comprises a first drum of expandible radii, means for holding the spot-trace seismogram on the cylindrical surface of said drum, means for adjusting the radii of said drum whereby a given time interval on said spot-trace seismogram may be made to subtend a predetermined central angle of said drum, a moving-mirror type galvanometer whose axis of rotation is at right angles to the axis of said drum, a light beam impinging on the mirror of said galvanometer, photoelectric means, means supporting said galvanometer and said photoelectric means so that the light beam reflected from the mirror of said galvanometer traverses the spot-trace seismogram and impinges on said photoelectric means, electric circuit means connected to said photoelectric means and to said galvanometer and including amplifier means whereby the galvanometer current is controlled to maintain said light beam reflected from the mirror of said galvanometer at the signal edge of the spot-trace seismogram, a second drum, means connected to said first drum and to said second drum rotating said drums in synchronism, means for holding a photographic recording medium on said second drum, an electric lamp mounted in proximity to said photographic recording medium, means connecting said lamp to said circuit means adapted to supply to said lamp a signal in accordance with the current in said galvanometer, masking means restricting the portion of said photographic recording medium illuminated by said lamp, means supporting said lamp and masking means, said support means being movable in a direction parallel to the axis of said second drum, and controllable positioning means connected to said support means positioning said lamp and masking means so as to traverse selected bands on said second drum.

7. Apparatus for converting a spot-trace-type transparent seismogram into a variable-density-type seismogram having a predetermined time scale which comprises a first drum of expandible radii, means for holding the spot-trace seismogram on the cylindrical surface of said drum, means for adjusting the radii of said drum whereby a given time interval on the spot-trace seismogram may be made to subtend a predetermined central angle of said drum, a moving-mirror type galvanometer whose axis of rotation is at right angles to the axis of said drum, a light beam impinging on the mirror of said galvanometer, photoelectric means, means supporting said galvanometer and said photoelectric means so that the light beam reflected from the mirror of said galvanometer traverses the spot-trace seismogram and impinges on said photoelectric means, electric circuit means connected to said photoelectric means and to said galvanometer and including amplifier means whereby the galvanometer current is controlled to maintain said light beam reflected from the mirror of said galvanometer at the signal edge of the spot-trace seismogram, a second drum, means connected to said first drum and to said second drum rotating said drums in synchronism, means for holding a photographic recording medium on said second drum, an electric lamp mounted in proximity to said photographic recording medium, means connecting said lamp to said circuit means adapted to supply to said lamp a signal in accordance with the current in said galvanometer, masking means restricting the portion of said photographic recording medium illuminated by said lamp to a zone of said second drum upon rotation thereof, escapement means connected to said masking means advancing the latter a predetermined distance parallel to the axis of said second drum upon completion of one turn of said second drum during which said lamp is illuminated.

8. Apparatus for converting a spot-trace-type transparent seismogram into a variable-density-type seismogram having a predetermined time scale which comprises a first drum of expandible radii, means for holding the spot-trace seismogram on the cylindrical surface of said drum, means for adjusting the radii of said drum whereby a given time interval on the spot-trace seismogram may be made to subtend a predetermined central angle of said drum, a moving-mirror type galvanometer whose axis of rotation is at right angles to the axis of said drum, a light beam impinging on the mirror of said galvanometer, photoelectric means, means supporting said galvanometer and said photoelectric means so that the light beam reflected from the mirror of said galvanometer traverses the spot-trace seismogram and impinges on said photoelectric means, electric circuit means connected to said photoelectric means and to said galvanometer and including amplifier means whereby the galvanometer current is controlled to maintain said light beam reflected from the mirror of said galvanometer at the signal edge of the spot-trace seismogram, a second drum, means connected to said first drum and to said second drum rotating said drums in synchronism, means for holding a photographic recording medium on said second drum, an electric lamp mounted in proximity to said photographic recording medium, means connecting said lamp to said circuit means adapted to supply to said lamp a signal in accordance with the current in said galvanometer, masking means restricting the portion of said photographic recording medium illuminated by said lamp to a zone of said second drum upon rotation thereof, escapement means connected to said masking means whereby said illuminated zone is progressively stepped along the drum parallel to the axis thereof, automatic control means connected to said drum-rotating means and to said lamp and to said escapement means effecting illumination of said lamp when in any position of said escapement throughout a single rotation of said second drum and effecting advance of said escapement by one unit at the completion of said single rotation.

9. Apparatus for copying a reproducible seismogram with a different time-length scale which comprises a first drum of expandible radii, means for holding the original seismogram on the cylindrical surface of said drum, playback means engaging the original seismogram and reproducing the signals thereof, a second drum, means connected to said first drum and to said second drum rotating said drums in synchronism, means for holding a recording medium on said second drum, recording means engaging said second recording medium and connected to said play-back means, and means adapted to expand the radii of said first drum comprising a shaft, a disk fastened to said shaft, a cone on said shaft, means for moving said cone axially on said shaft, a plurality of angularly spaced radial arms slidingly mounted on said disk, means connected to each of said arms urging the inner end thereof into contact with the surface of said cone, an open flexible band having sufficient rigidity to maintain the shape of a circular sector contacting the outer ends of said arms, and means holding said band in contact with the outer end of each of said arms.

10. Apparatus for copying a reproducible seismogram with a different time-length scale which comprises a first drum of expandible radii, means for holding the original seismogram on the cylindrical surface of said drum, play-back means engaging the original seismogram and reproducing the signals thereof, a second drum, means connected to said first drum and to said second drum rotating said drums in synchronism, means for holding a recording medium on said second drum, recording means engaging said second recording medium and connected to said play-back means, and means adapted to expand the radii of said first drum comprising a shaft, a disk fastened to said shaft, a thread on the end of said shaft above said disk, a conical nut on said threads, a plurality of angularly spaced radial arms slidingly mounted on said disk, means connected to each of said arms urging the inner end thereof into contact with the conical surface of said nut, an open flexible band having sufficient rigidity to maintain the shape of a circular sector contacting the outer ends of said arms, and means holding said band in contact with the outer end of each of said arms.

References Cited in the file of this patent

UNITED STATES PATENTS

| | | |
|---|---|---|
| 2,604,955 | Hawkins | July 29, 1952 |
| 2,710,191 | Williams | June 7, 1955 |